Sept. 23, 1969

C. M. SENN ET AL 3,469,064

FLASH STRIP WELDER

Filed Oct. 21, 1966

INVENTORS
Charles M. Senn
Owen S. Cecil Jr.
their Attorneys

Sept. 23, 1969  C. M. SENN ET AL  3,469,064

FLASH STRIP WELDER

Filed Oct. 21, 1966

INVENTORS

Charles M. Senn
Owen S. Cecil Jr.

INVENTORS
Charles M. Senn
Owen S. Cecil Jr.

Fig. 9

INVENTORS
Charles M. Senn
Owen S. Cecil Jr.

United States Patent Office 3,469,064
Patented Sept. 23, 1969

3,469,064
FLASH STRIP WELDER
Charles M. Senn and Owen S. Cecil, Jr., Pittsburgh, Pa., assignors to Mesta Machine Company, Pittsburgh, Pa., a corporation of Pennsylvania
Filed Oct. 21, 1966, Ser. No. 588,485
Int. Cl. B23k 9/02, 11/02, 11/04
U.S. Cl. 219—101                                    12 Claims

ABSTRACT OF THE DISCLOSURE

A welding machine with a pair of first die assemblies and an opposed pair of die assemblies. One of the first die assemblies is mounted upon the apparatus' supporting framework. The opposed one of the opposed pair of die assemblies is mounted for vertical movement. The remaining die assemblies are mounted upon a laterally moveable frame of the apparatus. The other of the opposed pair of die assemblies is mounted on the moveable frame for vertical motion relative to the other of said first die assemblies. The moveable frame is mounted on an eccentric portion of a supporting shaft which is slideably mounted on the supporting framework and rotatably mounted relative to the supporting framework and moveable frame. Means are included for rotating the shaft and eccentric portion to import incremental changes in the elevation of the moveable frame and die assemblies thereon to aid in alignment of the workpiece engaging surfaces thereof.

---

The present invention relates to welding equipment and more particularly to means associated therewith for supporting, aligning and securing the welding dies thereof. Specifically, the invention relates to welding equipment of the character described and adapted for simultaneously welding along a junction between abutting ends of metallic strips. Such equipment frequently is referred to as a "flash strip welder."

Conventionally, the aforementioned dies are held in place in the welding equipment by a number of ordinary mounting bolts which are difficult to reach and which usually require special tools for their insertion or withdrawal due to the space limitations imposed by the equipment. Moreover, when replacing or otherwise removing the welding dies, their mounting bolts must be removed and replaced one by one, and thus considerable time and labor is involved with attendantly high operating costs, inasmuch as the welding dies are not only subject to considerable wear but also require frequent replacement due to changes in welding applications and procedures.

When the welding dies are installed or replaced in the equipment, it is essential that they be perfectly aligned or matched in order to obtain a satisfactory weldment. In accordance with known practice, the welding dies can only be aligned by shimming under one die or under its housing until alignment is achieved. This is a time-consuming method, and therefore unduly expensive, which is not particularly productive of satisfactory results. This approach is unsatisfactory for the reasons that a large number of shims of varying thickness are required, which are easily damaged or misplaced, and the incremental elevational changes attained thereby seldom produce a perfect alignment.

These problems and their attendant difficulties are overcome by the provision of welding apparatus pursuant to the teachings of our invention. In our apparatus, there is provided quick attach and release means for securing the die members to their respective die housings or other supporting means incorporated in our apparatus. The quick die attach and release means are readily operable from points removed from the welding dies and are conveniently located either on the welding equipment or remotely therefrom in the case of automated equipment. The die securance means are arranged for manipulation by a biased plunger or other connector, which in turn is activated by suitable external driving means such as a hydraulic piston and cylinder arrangement, cams, magnetic clutch, or the like.

When the die members are thus positioned, means are incorporated in our apparatus for raising, lowering or tilting at least one of the die member housings in order to exactly align the strip-engaging surface thereof with the similarly disposed surface of the other die member. The die housing adjustment means of our apparatus can take various forms such as the provision of eccentrically mounted shafts to raise, lower or tilt the die housing or the provision of adjustable wedges under slide bars or the like on which the die housing is movably mounted.

These and other objects, features, and advantages of the invention, together with structural details thereof, will be elaborated upon as this description of certain presently preferred embodiments thereof and presently preferred methods of practicing the same proceeds.

In accompanying drawings, I have shown certain presently preferred embodiments and have illustrated certain presently preferred methods of practicing the same, wherein.

Figure 3:
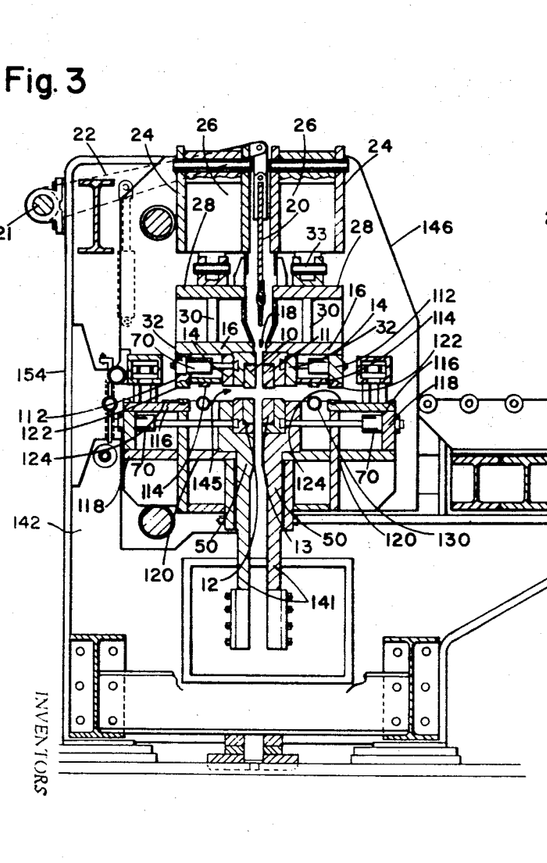
FIGURE 3 is a vertically sectioned view of the apparatus as shown in FIGURE 2 and taken generally along reference line III—III thereof.
Figure 4:
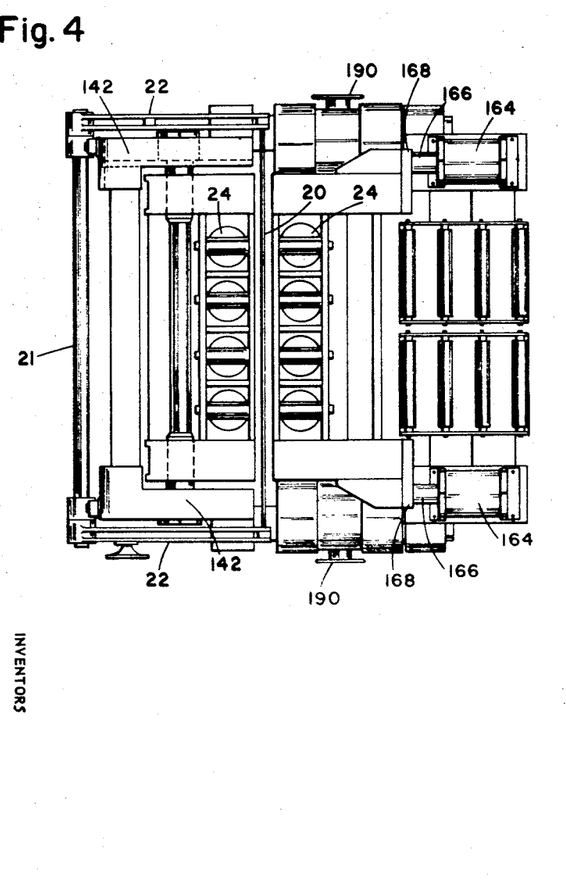
FIGURE 4 is a top plan view of our welding apparatus as shown in FIGURE 1.

Referring now more particularly to FIGURES 1 to 4 and 7 of the aforementioned quick-attached and released die securance means, forming part of our welding apparatus, is illustrated therein. As shown in the drawings, respective pairs of upper and lower die assemblies 10, 11 and 12, 13 are each supported in individual housings therefor. The upper die assemblies 10, 11 are housed or confined by a pair of vertically extending plates 14 and horizontal supporting plates 16. The plates 16 are spaced to define an entrance opening 18 for insertion of a weld spacing head or plate denoted generally by reference character 20 and pivotally supported at its upper end from operating arms 22 (FIGURE 4). The arms 22 are pivotally displaced by shaft 21 and by a piston and cylinder arrangement connected to one of the arms 22 and denoted generally by reference character 23. The cylinder 23 is secured at its lower end to one of the vertical welder supports 142 described hereinafter. The position of the spacing plate 20 can be denoted by a suitable gauge 25.

Each upper die housing, as defined by the housing plates 14, 16 is independently supported by a hydraulic cylinder and piston bank denoted generally by reference character 24. The individual pistons 26 of each bank are connected to the respective die housings 14–16 by an additional horizontally extending supporting plate 28 and vertical connecting plate 30. Each pair of the plates 28 and 30 together with one of the die housing component plates 16 are assembled to form web and flange members of an I-beam denoted generally by reference character 32, and co-extended laterally or horizontally of the welding apparatus with the die assemblies 10 and 12 as better shown in FIGURE 2 of the drawings. The pistons 26 can be pivotally connected to the upper surfaces of the I-beam structures 32 by eye-bracket and female clevis assemblies 33.

Figure 9:
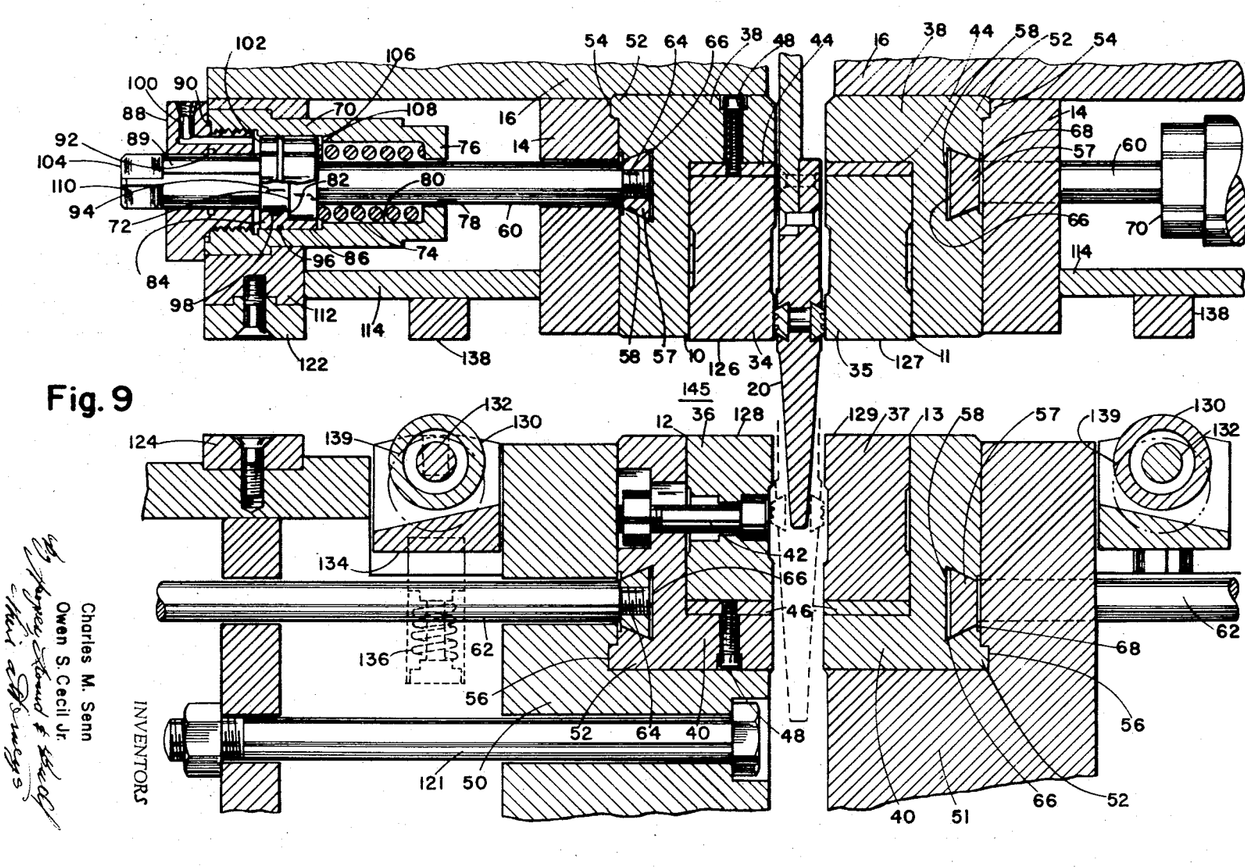
FIGURE 9 is an enlarged partial vertically sectioned view of the die members and their housings and associated components as shown in FIGURE 3 of the drawings.

The die assemblies 10–13 include, as better shown in FIGURE 9, die-blocks 34–37 retained respectively in channeled back-up members or brackets 38–40. The die-blocks 34–37 desirably are fabricated from a very hard material such as berrylium copper while the channel members 38 and 40 can be fabricated from ordinary steel. In this arrangement, the die-blocks 34–37 are secured respectively to their channel members 38 and 40, which coextend longitudinally therewith, by means of a plurality of mounting bolts (FIGURE 2) 42 spaced along the lengths thereof, with one form of such mounting bolt arrangement being detailed in FIGURE 9 of the drawings. Depending upon the particular application of the welding apparatus, and the required heights of the die-blocks 34–37, a longitudinally extending spacer plate 44 or 46 can be mounted above the die-blocks 34, 35 and/or below the die-blocks 36, 37. The spacer plates 44 and 46 when used are secured to the adjacent portions of the channel members 38 and 40 respectively by means of mounting screws 48. Therefore, each of the upper and lower die assemblies 10, 11 and 12, 13 can be installed and removed from the welding apparatus as a single unit.

When thus installed, each channel member 38 or 40 is properly positioned in its associated upper housing 14–16 or lower housing 50, described below. One arrangement for thus positioning the die asemblies 10–13 includes forming a longitudinal projection or key 52 on the outer surfaces of the die brackets 38 and 40 respectively, for example, at the outside corners thereof. The key members 52 of the upper dye brackets 38 respectively, cooperate with keyways or longitudinally extending recesses 54 formed complementarily in the adjacent surfaces of the housing members 14, 16 and extending substantially co-extensively therewith. The key members 52 of the lower channel members 40 similarly cooperate with keyways 56 formed respectively in the lower die housings 50 and likewise co-extending therewith.

Accordingly, when the die assemblies 10–13 are not affixed to their respective housings 14–16 and 50, as by operation of my quick-release die-assembly securance means, they can be readily inserted or withdrawn by loosely sliding engagement with their housings. One arrangement of our die securance means, which can be operated from an external position relative to the welding apparatus or form a more remote location, if desired, is illustrated in FIGURES 3 and 9 of the drawings. In this arrangement of the die-securance means, a dove-tailed bar 57 is loosely mounted in a dove-tailing groove 58 of each die-bracket 38 or 40. Each pair of cooperating dove-tail bars and grooves 57, 58 desirably extends longitudinally along the length of the associated die-bracket 38 or 40, and each dove-tailed bar 57 is supported by a plurality of plungers or shafts 60 or 62 respectively, with one such shaft 60 or 62 being shown for each dove-tailed bar 57, as shown in FIGURE 9 of the drawings. In this arrangement, each of the plungers 60 and 62 are arranged for a limited rectilinear movement relative to the die assemblies 10–13 and are threadedly engaged with the associated dove-tailed bar 57 as denoted by reference character 64.

Figure 1:
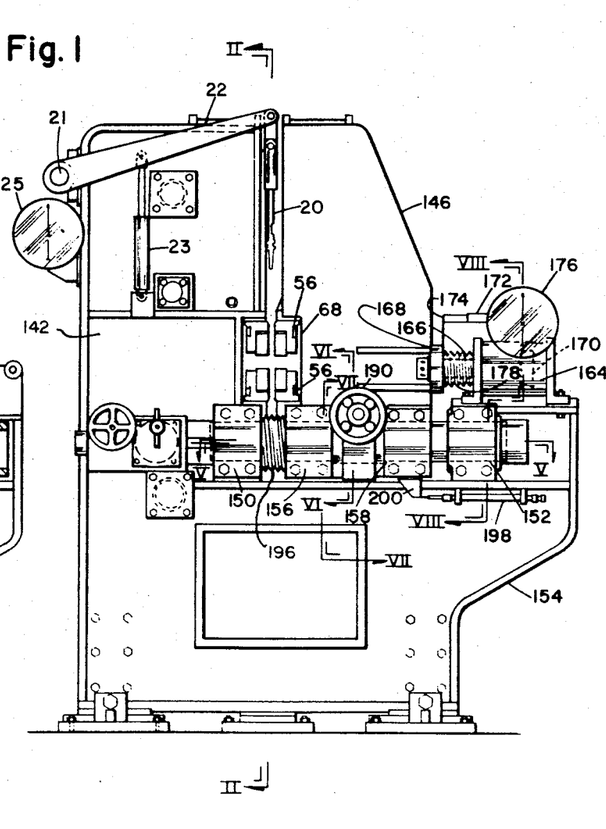
FIGURE 1 is a side elevational view of one form of welding apparatus arranged in accordance with our invention.
Figure 2:
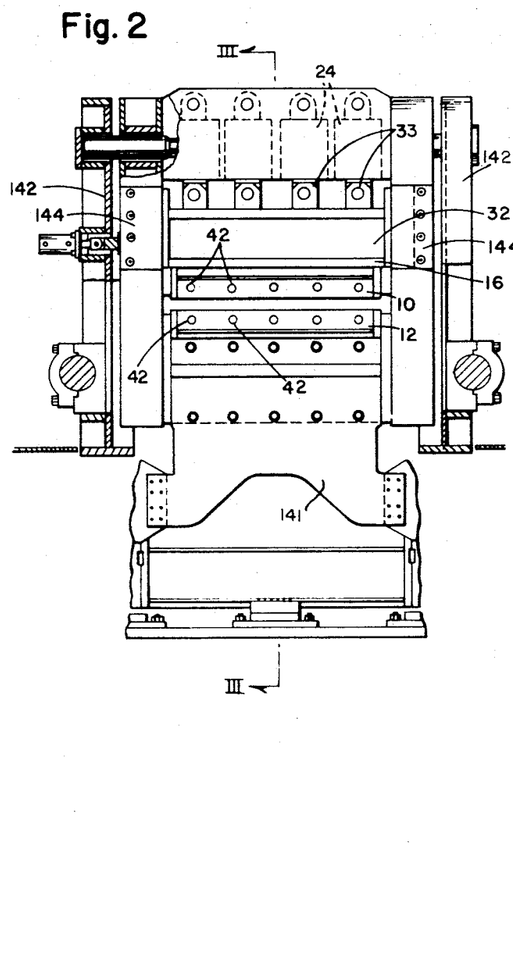
FIGURE 2 is a vertically sectioned view of the apparatus shown in FIGURE 1 and taken generally along reference line II—II thereof.

Means are provided in accordance with our invention for laterally moving each of the dove-tailed bars 57 laterally, or toward and away from the die-blocks 34–37 respectively. Each of the dove-tailing grooves 58 is provided with a bottom clearance 66 to accommodate lateral inward movement of the associated dove-tailed bar 57. Upon such movement, the dove-tailed bars 57 fit loosely in their associated grooves 58 so that the associated die assemblies 10–13 can be freely withdrawn from either side of the welding apparatus through openings 68 therein (FIGURE 1).

When the die assemblies 10–13 are re-inserted or replaced in the respective housings, the assemblies are guided into their proper positions relative to their respective housings 14–16 and 50 by engagement with the aforementioned keyways 54, 56 and with the dove-tailed bars 57 respectively, which, of course, remain at their inmost positions where they loosely engage dove-tailing grooves 58 of the die assemblies.

The inserted die assemblies 10–13 are then respectively secured to their housings by actuating the plungers 60 and 62 to move the dove-tailed bar members 57 outwardly or away from the die-blocks 34–37. This causes the dove-tailed bars 57 to bearingly engage the complementarily sloping sides of the associated dove-tailing grooves 58. This operation causes the die-brackets 38 and 40 to engage bearingly their respective housings to that the die assemblies 10–13 are clamped therein by frictional engagement of their associated die-brackets or housing 38 and 40 both with their respective housings and with their dove-tailed supporting bars 57. In order to ensure a bearing engagement between the dove-tailed bars and their respective dove-tailing grooves 58, a counter-sunk clearance 68 is formed in each die-bracket or housing 38 and 40 and disposed adjacent the entrance opening of the associated dove-tailing groove 58.

One arrangement for actuating the plungers 60 and 62 to produce the aforedescribed movements of the dove-tailed bars 57 includes the provision of a plunger drive means housing 70 for each of the plungers 60 and 62, (FIGURE 3), with one such housing and associated components being detailed in FIGURE 9. In accordance with this modification of my welding apparatus, each of the plungers 60 or 62 is formed at its outer end with a circumferential flange or spring stop 72 which engages one end of a compressed biasing spring 74 surrounding the adjacent end portion of the plunger and retained between the aforementioned spring stop 72 and the inward end portion 76 of the drive means housing 70. The plunger is extended through an aperture therefor 78 in the housing end portion 76 and through the reduced spring-retaining portion 80 thereof. The spring stop 72, in this example, is rotatably mounted within an internally enlarged section 82 of an actuating piston 84 for the associated plunger 60 or 62. The piston 84 is mounted for reciprocating movement within an intermediate or cylinder portion 86 of the drive means housing 70.

Thus, engagement of the compressed coil spring 74 with the plunger spring stop 72 urges both the plunger and its piston 84 toward the outer end of the drive means housing 70 which is closed by threaded engagement with an annular plug member 88. The biased outward movement of the plunger 60, in this arrangement, also biases the dove-tailed bars 57 into the aforementioned bearing engagement with their dove-tailed grooves 58, to secure the die assemblies 10–13 as described previously. The annular, threaded plug 88 is sealed at its respective junction with the drive means housing 70 and with an outwardly protruding extension 89 of the plunger 60 or 62 by means of O-rings 90 and 92 respectively. Similarly, the piston 84 is sealed to the cylinder wall portion 86 of the housing 70 and to a journaled section 94 formed on the plunger 60 or 62 by means of O-rings 96 and 98 respectively.

In order to release the dove-tailed bars 57 in their dove-tailing recesses 58, means are provided for moving each of the plungers 60 and 62 inwardly against the action of their biasing springs 74. One arrangement for accomplishing this includes the use of the aforedescribed piston 84 by the admittance of a hydraulic fluid or the like through passages 100 formed in the annular plug 88. The forces exerted by the hydraulic fluid act between outer annular surface 102 of the piston 84 and the inner end of the annular plug 88 to force the piston 84 inwardly to release the dove-tailed bars 57 and thereby to release the die-brackets 38 and 40, after which the loosened die-assemblies 10–13 can be removed from the apparatus. Other means, for example a cam opeartor (not shown), acting upon the protruding outer ends 104 of plungers 60 and 62 can be used instead of the piston and cylinder arrangement 84, 86 to drive the plungers inwardly, in which case the piston and cylinder arrangement 84, 86 and the hydraulic connections can be omitted from the housing 70. A clearance 106 is provided between the inward end of the piston 84 and the inward extremity of the cylinder portion 86 to provide for inward movement of the piston 84 against the action of the biasing spring 74. The adjacent inwardly shouldered portion 108 of the housing 70 provides a stop when engaged by the piston 84 to limit the inward movement of the plungers 60 and 62 and the dove-tailed bars 56 and 57. The aforementioned outer or protruding end 104 of each plunger 60 and 62 is provided with a wrench- or other suitable tool-engaging configuration 110 so that the plunger 60 or 62 can be rotated to thread or unthread the plungers from the dove-tailed bars 57 when assembling or dis-assembling the welding apparatus.

The upper drive means housing 70 is mounted upon depending supporting plates 112 and lateral stabilizing plates 114, which are secured respectively to one another and to the upper housing sections 16 and 14. The lower drive means housings 70 are similarly mounted upon an angularly disposed supporting plate structure 116–118 forming part of the lower die housing supporting structures denoted generally by reference characters 120.

When the upper die supporting structure is lowered by operation of the piston and cylinder banks 24–26, a pair of stop plates 122 and 124 adjacent the front and back portions of the welding apparatus are engaged. The stop plates are secured respectively to the aforementioned upper and lower supporting plates 112 and 116. The juxtaposed surfaces of the stop plates 122 and 124 are aligned respectively with the bottom surfaces 126, 127 of the upper die assemblies and with the upper surfaces 128, 129 of the lower die assemblies respectively. Thus, when the upper die assemblies 10, 11 are lowered to clamp the strips to be welded, the strips (not shown) are respectively engaged also by a pair of the stop plates 122, 124 on each side of the die assemblies, as better shown in FIGURE 3 of the drawings. Lateral alignment of the strips can be effected, even after they are clamped between the respective pairs of die assemblies, for example by the means described and claimed in a copending, coassigned application of C. M. Senn et al., filed concurrently herewith on Oct. 21, 1966, and entitled "Side-Shifting Welder Housing or the Like," Ser. No. 588,484.

With the die assemblies in the opened position thereof, as shown in FIGURE 9, a pair of strip lifting rollers 130 are arranged for engagement with the strips respectively as the latter are pushed into the welding apparatus from opposite sides respectively of the die assembly arrangement. The rollers 130 are mounted at their ends by means of stub shafts 132 which in turn are mounted upon spring-loaded supports 134. The springs 136 for the supports 134, are arranged to normally support the rollers 130 at a position above the top surface elevation of the lower die assemblies 12, 13 which determines the workpiece pass line through the welding apparatus. However, when the upper die assemblies 10, 11 are lowered to clamp the respective strips against the associated die assemblies, a pair of stop plates 138 respectively engage the strips to depress the strips and the rollers 130 engaged thereby downwardly to the loaded portions thereof as denoted by dashed outlines 139 (FIGURE 9).

After the weld is completed, the spring-loaded rollers 130, which are thereby permitted to move upwardly, force the welded strip upwardly and away from the surface portions of the die assemblies. With this arrangement, the flash material which is usually formed with the weldment, is separated from the die surfaces so that the flash material cannot scrape or chip or otherwise damage the die assemblies, as the welded strip is removed from the apparatus. This arrangement is particularly useful since it is very important to avoid damage to the die-block corners adjacent the welding faces 126–129 thereof. Nicked or rounded off corners render control of the welding process difficult and unpredictable.

Before the strip ends to be welded are clamped respectively by each juxtaposed pair of upper and lower die assemblies, 10, 12 and 11, 13, the tapered gauge plate 20 is lowered to a specific distance depending upon the thickness of the strips to be welded. The strips are then urged forcefully against the gauge plate 20, and, depending upon the thickness of the strip and the position of the gauge plate, a predetermined amount of overhang is obtained by extension of the respective leading edges of the strip into the vertical gap 18 as defined by the opened position of the pair of movable upper and lower die assemblies 10, 12, the lateral movement of which is controlled by horizontally disposed cylinders 164 described below. The upper die assemblies 10, 11 are then moved downwardly to clamp the strips respectively between the upper and lower die assemblies 10, 12 and 11, 13. The gauge plate 20 is then removed, and the right hand or movable upper and lower die assemblies 11, 13, as viewed in FIGURES 3 and 9 of the drawings, are then moved to the left in the vertical gap closing direction toward stationary die assemblies 10, 12. The weld is effected upon abuttment of the aforementioned strip edges, with the necessary weld material being supplied by fusion of the aforementioned overhanging strip edge portions, for which purpose a continued, gap-closing biasing force is applied by the cylinders 164.

When the upper die assembly 11 and the lower die assembly 13 are moved laterally, in the manner described in greater detail below, to engage the edges of the strips to be welded, an electrical circuit is, of course, completed through the individual die blocks 34–37 and the strip portions (not shown) clamped therebetween. In furtherance of this purpose, the lower die housings 50 are desirably fabricated from electrically conducting structural materials. As better shown in FIGURES 2 and 3 of the drawings, welding current is supplied to the lower die housings 50 for example, by means of suitable bus bars, one of which is designated at 141 in FIGURE 2.

As better shown in FIGURES 1 and 3 of the drawings, only one of the laterally stationary die assemblies 10, 12 is mounted at a vertically stationary position in the welding apparatus. In this arrangement, the lower left hand die assembly 12 and its associated housing 50 are so mounted. The associated upper or left hand die (as viewed in FIGURE 3) 10 and its housing are vertically movable mounted as noted above by means of the cylinder bank 24. When the upper die assembly 10 is lowered from its open position, as illustrated in FIGURES 1 to 3, alignment thereof with the stationary lower die assembly is assured by a pair of vertical slideway structures 144.

The other lower die assembly 13 and associated components are mounted for limited, adjusting vertical movement, in a manner described hereinafter, so that the top surface of the die assembly 13 can be aligned or disposed precisely at the same elevation as the top surface of the stationary die assembly 12.

The corresponding upper die assembly 11 is mounted for vertical movement in a manner similar to that described in connection with the other upper die assembly 10 to close the horizontal gap 145 between the right-hand pair of upper and lower die assemblies 11 and 13. The upper die assembly 11, however, by means of its associated cylinder bank 24 is mounted upon a supporting frame indicated generally by reference character 146, which in turn is slidably mounted upon the lower welding apparatus framework 154 for limited horizontal movement relative thereto to close the vertical gaps 18 between the lower die assemblies 12, 13 and the upper die assemblies 10, 11, as described below.

In order to provide horizontal movement of the upper and lower die assemblies 11, 13 as well as adjusting vertical movements of the lower die assembly 13 which is carried on the supporting frame 146, the latter is mounted upon a pair of eccentric shafts 148, which in turn are mounted adjacent their ends in bearing housings 150 and 152. Bearing housings 150, 152 are rigidly supported upon the aforementioned lower framework 154 or supporting structure for the welding apparatus.

Figure 5:
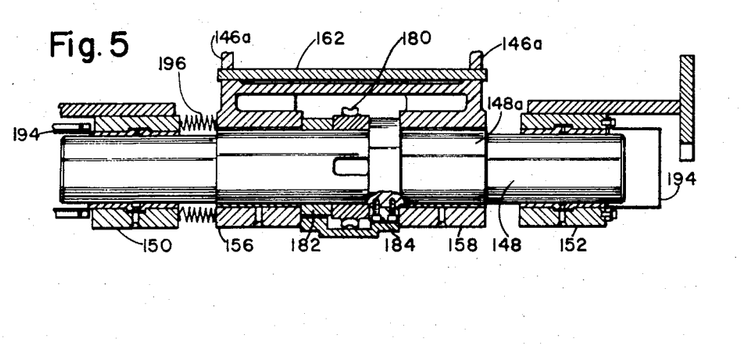
FIGURE 5 is an enlarged partial, horizontally sectioned view of one form of die-housing leveling mechanism forming part of our apparatus and taken generally along reference line V—V of FIGURE 1.
Figure 6:
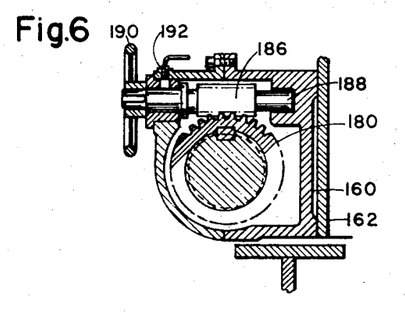
FIGURE 6 is a cross-sectional view of the apparatus as shown in FIGURE 5 and taken generally along reference line VI—VI thereof or enlarged along reference line VI—VI of FIGURE 1.
Figure 7:
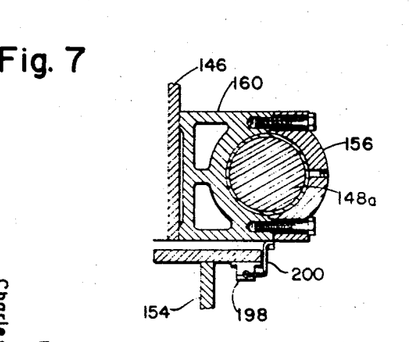
FIGURE 7 is an enlarged vertically sectioned view taken generally along reference line VII—VII of FIGURE 1.
Figure 8:
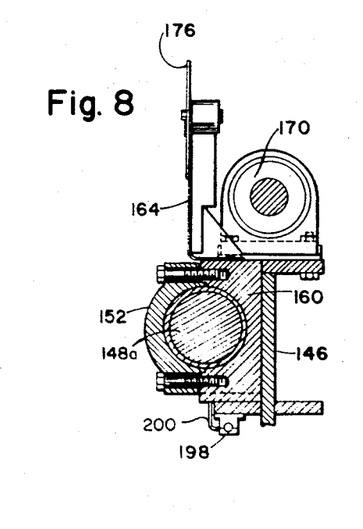
FIGURE 8 is an enlarged partial, vertically sectioned view of the apparatus shown in FIGURE 1 and taken generally along reference line VIII—VIII thereof.

As better shown in FIGURES 5 to 8 of the drawings, each eccentric shaft 148 both is rotatably and slidably mounted in the bearing housings 150, 152, while the intermediate or eccentric portion 148a of the shaft 148 is mounted for limited rotative movement within a pair of bearing housings 156 and 158, which are rigidly interconnected by means of a common housing member 160 and overlying supporting plate 162. Upon the supporting plates 162 and hence upon the bearing structures 156, 158 the horizontally movable support structure 146 is mounted, as denoted by the broken-away portion thereof 146a (FIGURE 5). Means, therefore, are provided for horizontally sliding the eccentric shafts 148 relative to its supporting bearing housing 150 and 152, and therefore, relative to the bottom supporting framework 154 of the welding apparatus, so that the upper and lower right hand die assemblies 11 and 13 respectively can be moved therewith to open and close the vertical gaps illustrated between the upper pair of die assemblies 10, 11 and between the lower pair of die assemblies 12, 13.

One arrangement for so moving the shaft 148 is shown in FIGURES 1 and 4 of the drawings where driving cylinder and piston arrangements denoted generally at 164 are mounted on the upper surfaces of the adjacent bearing housings 152 and on the framework 154. Piston shafts 166 are bolted to connecting plates 168 forming part of the movable frame 146 so that reciprocating movement of pistons 170 produces the corresponding horizontal movement of the framework 146 to open and close the aforementioned vertical welding gaps. If desired, an actuating rod 172 and supporting bracket 174 respectively can be secured to one of the connecting plates 168 and to a gap width gauge denoted generally by reference character 176 to provide a continuous measurement of the horizontal separation of the upper die assemblies 10, 11 and the lower die assemblies 12, 13. Also, if desired, a bellows 178 can be secured about the exposed portions of the piston rod 166 to prevent the entry of dirt and other foreign matter into the cylinder 164.

When the upper die assemblies 10 and 11 are lowered to their respective operating conditions relative to the lower die assemblies 12 and 13 the relative elevations of their lower or work faces 126 and 127 are, of course, determined by the opposing top surfaces 128 and 129 of the lower die assemblies 12 and 13. Accordingly, in this arrangement it is necessary only to align the top surface 129 of the vertically adjustable lower die assembly 13 with the top surface of the stationarily supported lowered die assembly 12. Therefore, as noted previously, means are provided for imparting a limited vertically adjusting movement to one of the lower die assemblies, as for example, the lower die assembly 13. In this modification of the invention, this result is retained by providing means for imparting a limited rotation to each movable frame supporting shaft 148, on the eccentric portion 148a of which the movable frame 146 is mounted, as aforedescribed. As seen in FIGURES 1, 4, 6 and 7, such means includes a worm-gear 180 which is pinned or otherwise secured to the eccentric portion 148a of the shaft 148 for rotation therewith at a position intermediate the supporting bearing housings 156, 158 of the movable frame 146. Lateral movement, however, of the worm-gear 180 and hence of the eccentric shaft portion 148a relative to the bearing housing 156, 158 is prevented through the use of tubular spacers 182 and 184 arranged on either side of the worm-gear 180. The worm-gear 180 is rotated by means of worm 186 secured to a shaft 188 therefor which in turn is mounted in the connecting housing extension 160 as better shown in FIGURE 6 of the drawings. The worm shaft 188 is rotated by suitable drive means such as hand-wheel 190 which is keyed or otherwise secured to the worm-shaft 188 for rotation therewith. When the supporting shaft 148 has been rotated to achieve the required adjusting vertical movement of the lower right hand die assembly housing 51 by the accompanying angular displacement of its eccentric portion 148a, the supporting shaft 148 is locked against further rotation by suitable lock means 192 engageable with the worm-shaft 188. Each end of the vertically adjustable lower die assembly 13 therefore can be adjusted independently of the other end, by handwheels 190 (FIGURE 4), to eliminate skew between the upper surfaces 128 and 129 of the lower die blocks 36 and 37 respectively.

Where dirt conditions are severe, shaft end caps 194 can be secured respectively to the supporting bearing housings 150, 152 to prevent the entry of foreign matter. Similarly, a bellows type seal 196 can be secured between either or both bearing housings 150, 152 and the adjacent movable frame bearing housing 156 or 158.

Other means can obviously be employed for the elevational adjustment of the bottom die assemblies 12, 13. For example, if a less meticulous control thereof is desirable, depending upon the application of the invention, the supporting shaft 148 can be replaced by a non-rotatable slide bar (not shown), for example, of square or rectangular configuration, and an adjustable wedge arrangement (not shown) can be incorporated between the movable frame 146 and the bar or between the bar and the lower supporting framework 154, in order to impart the desired increment of movement to the adjustable lower die assembly.

From the foregoing it will be apparent that novel and efficient forms of welding apparatus have been disclosed herein. While I have shown and described certain presently preferred embodiments of the invention it is to be distinctly understood that the invention is not limited thereto, but can be otherwise variously embodied within the scope of the following claims.

We claim:

1. In a welding apparatus, the combination comprising a plurality of die-assembly housings mounted on said apparatus, a die assembly slidably mounted on each of said housings, cooperating clamp members and recess means formed in each of said housings an actuating rod extending through each of said housings and engaging the associated clamping member mounted thereon, biasing means for actuating said rods to engage said clamping members so that the die assemblies are normally biased into rigid engagement with their respective die-assembly housings, and means for actuating each of said rods in the opposite direction against the action of said biasing means to release said keying members and to permit sliding withdrawl of the die assembly from their housings.

2. In a welding apparatus, the combination comprising a plurality of elongated die-assembly housings mounted on said apparatus, an actuating rod extending transversely through each of said die-assembly housings, an elongated keying member for each of said housings and extending substantially along the length thereof, said keying members being connected to said actuating rods respectively for movement therewith, a die-assembly for each of said housings and having an elongated keying slot cooperatively engaged with the associated one of said keying members, said keying members being slidably mounted in said slots, said actuating rods being extended through the slots for engagement with said keying members respectively, means for biasing said actuating rods outwardly of said slots and said die assemblies to tighten said keying members within their respective keying slots to rigidly ecure said die assemblies to their respective housing, and means for actuating each of said rods in the opposite direction against the action of said biasing means to release said keying members and to permit sliding withdrawl of the die assemblies from their housings.

3. In a welding apparatus, the combination comprising a pair of first die assemblies and an opposed pair of die assemblies, one of said first die assemblie being stationarily mounted upon supporting framework of said apparatus, the opposed one of said opposed pair of die assemblies being mounted for vertical movement relative thereto, the remainder of said die assemblies being mounted upon a laterally movable frame of said apparatus, the other of said opposed pair of die assemblies being mounted on said movable frame for vertical movement relative to the other of said first die assemblies, said movable frame being mounted upon an eccentric portion of at least one supporting shaft therefor, said supporting shaft being slidably mounted upon said supporting framework and in addition being rotatably mounted relative to said supporting framework and to said movable frame, and means for rotating said shaft including said eccentric portion to impart incremental changes in elevation of said movable frame including the die assemblies mounted thereon relative to the remaining die assemblies in order to align the workpiece engaging surfaces thereof.

4. The combination according to claim 3 characterized in that each of said die assemblies is slidably mounted upon a die-assembly housing therefor, complementarily shaped keying bar and slot means are mounted on each of said die assemblies and its respective housing, and an actuating rod is inserted transversely through each of said housings and is secured to the associated keying bar, and means are provided for actuating each of said rods for securing and releasing said keying bars relative to said slots to permit securing and releasing said die assemblies relative to said housings.

5. In a welding apparatus, the combination comprising a first pair of die assemblies and an opposed pair of die assemblies, one of said first die assemblies being stationarily mounted on said apparatus, the opposed one of said opposed pair of die assemblies being mounted for vertical movement relative thereto, the remainder of said die assemblies being mounted upon a laterally movable framework of said apparatus, the other of said opposed pair of die assemblies in addition being mounted on said laterally movable framework for vertical movement relative to the other of said first die assemblies, said movable framework being mounted upon an eccentric portion of a supporting shaft therefor, said supporting shaft being slidably mounted upon said apparatus and in addition being rotatably mounted relative to said apparatus and to said movable framework, and means for rotating said shaft to impart incremental changes in elevation of the die assemblies mounted thereon relative to the remaining die assemblies in order to align the workpiece engaging surfaces thereof, a pair of stop plates mounted on said apparatus at each side of said die assemblies in juxtaposed relationship, the opposed surfaces of said stop plates being aligned respectively with the opposed surfaces of said die assemblies to facilitate alignment of workpieces inserted between said die assemblies.

6. In a welding apparatus, the combination comprising a pair of upper die assemblies and an opposed pair of lower die assemblies, one of said lower die assemblies being stationarily mounted upon a lower supporting framework of said apparatus, the opposed one of said upper die assemblies being mounted for vertical movement relative thereto upon a stationary vertical support of said apparatus, the remainder of said die assemblies being mounted upon a laterally movable frame of said apparatus, the other one of said upper die assemblies in addition being mounted on said movable framework for vertical movement relative to the other of said lower die assemblies, said movable frame being mounted upon an eccentric portion of a supporting shaft therefor, said supporting shaft being slidably mounted upon said apparatus lower framework and in addition being rotatably mounted relative to said apparatus lower framework and to said movable frame, and means for rotating said shaft to impart incremental changes in elevation of said movable frame including the die assemblies mounted thereon relative to the remaining die assemblies in order to align the workpiece engaging surfaces thereof, a pair of workpiece engaging rollers rotatably mounted on each side respectively of said die assemblies upon said lower supporting framework, each of said rollers being resiliently mounted and normally projecting above the upper surfaces of said lower die assemblies, workpiece engaging stop members juxtaposed to said rollers and secured respectively to said vertical support and to said movable frame, said stop members engaging said workpieces when the latter are clamped between said die members to depress said workpieces and said resiliently mounted rollers to position of alignment with the top surfaces of said lower die assemblies, the resilient mountings of said rollers being disposed to return said rollers and said workpieces to their normal positions following vertical separation of said die assemblies so that said workpieces can be withdrawn without damage to the adjacent surfaces of said die assemblies.

7. The combination according to claim 3 characterized in that said movable frame is rotatably mounted upon an intermediate eccentric portion of said supporting shaft and the end portions of said shaft are rotatably and slidably mounted with respective bearing housings mounted on said supporting framework.

8. The combination according to claim 7 characterized further in that rotating means for said supporting shaft are mounted on said movable frame in engagement with said intermediate eccentric shaft portion so that said shaft can be angularly displaced to adjust the elevation of the other of said first die assemblies on said frame relative to said one of said first die assemblies irrespective of the lateral position of said movable frame.

9. The combination according to claim 3 characterized in that said die assemblies are elongated and extend generally transversely of said laterally movable frame, said movable frame is mounted upon eccentric portions of a pair of slidably and rotatably mounted shafts supported on said supporting framework, and said eccentric shaft portions are disposed adjacent the ends respectively of the other of said first die assemblies on said frame so that said last-mentioned die assembly can be elevated and paralleled relative to said one of said first die assemblies to align the workpiece engaging surfaces thereof and to eliminate skew therebetween.

10. The combination according to claim 1 wherein said recesses are dove-tailing slots extending substantially along the length of said housings, and said clamp members are dove-tailed bars substantially co-extending with said slots respectively.

11. The combination according to claim 10 wherein each of said housings is counter sunk about its associated slot to facilitate clamping movement of said clamping members under impetus of said biasing means.

12. The combination according to claim 1 wherein said actuating means includes a cylinder surrounding each of said actuating rods, a piston for each of said cylinders and mounted on the associated actuating rod, and a free end of each rod protruded from the associated end of its cylinder for independent actuation of said rod by engagement with external means.

References Cited

UNITED STATES PATENTS

| 2,204,858 | 6/1940 | Hudson | 219—101 |
| 2,459,625 | 1/1949 | Copp | 219—101 |
| 3,088,020 | 4/1963 | Cooper et al. | 219—119 X |
| 3,293,401 | 12/1966 | Williams et al. | 219—97 |

JOSEPH V. TRUHE, Primary Examiner

B. A. STEIN, Assistant Examiner

U.S. Cl. X.R.

219—161

UNITED STATES PATENT OFFICE

CERTIFICATE OF CORRECTION

Patent No. 3,469,064                                September 23, 1969

Charles M. Senn et al.

It is certified that error appears in the above identified patent and that said Letters Patent are hereby corrected as shown below:

Column 8, line 71, "assembly" should read -- assemblies --. Column 9, line 13, "ecure" should read -- secure --; line 21, "assemblie" should read -- assemblies --. Column 10, line 44, "with" should read -- within --.

Signed and sealed this 21st day of April 1970.

(SEAL)

Attest:

Edward M. Fletcher, Jr.

Attesting Officer

WILLIAM E. SCHUYLER, JR.

Commissioner of Patents